United States Patent
Humlong

[15] 3,695,496
[45] Oct. 3, 1972

[54] BICYCLE BASKET
[72] Inventor: Robert F. Humlong, Maysville, Ky.
[73] Assignee: Wald Manufacturing Company, Incorporated, Maysville, Ky.
[22] Filed: Oct. 5, 1970
[21] Appl. No.: 78,041

[52] U.S. Cl. .................................... 224/36, 224/41
[51] Int. Cl. ................................................ B62j 7/06
[58] Field of Search.224/36, 32 A, 32 R, 30 A, 33 A, 224/39 A, 41

[56] References Cited

UNITED STATES PATENTS

| | | | |
|---|---|---|---|
| 2,253,649 | 8/1941 | Price | 224/36 |
| 1,908,535 | 5/1933 | Pawsat | 224/36 |
| 2,541,640 | 2/1951 | Dennis | 224/36 |
| 2,492,595 | 12/1949 | Rhoer | 224/41 |

Primary Examiner—Gerald M. Forlenza
Assistant Examiner—Jerold M. Forsberg
Attorney—J. Warren Kinney, Jr.

[57] ABSTRACT

Means in the form of a single, rigid mounting bracket having a first, depending leg secured to and carried by a bicycle basket and a second, rearwardly projecting mounting leg adapted to overlie the upper surface of the central portion of a velocipede handlebar is provided for eliminating the need for leather straps, metal clamps and the like as heretofore used for securing portions of the basket, per se, to those side portions of a handlebar which are on opposite sides of the central or stern portion thereof.

3 Claims, 6 Drawing Figures

PATENTED OCT 3 1972 3,695,496

INVENTOR
ROBERT F. HUMLONG
BY J. Warren Kinney Jr.
ATTORNEY

BICYCLE BASKET

BACKGROUND OF THE INVENTION

Heretofore bicycle baskets and particularly smaller sized baskets for use on tricycles, sidewalk bicycles and velocipedes have entailed the use of leather straps, metal clamps and the like which engage the top wire of the basket on opposite sides of the center of the handlebar for suspending the basket from to the side portions of the handlebar.

It has been difficult if not impossible to effectively secure such bicycle baskets to the handlebar portion of tricycles, sidewalk bicycles, velocipedes, and the like with the result that such baskets have for the most part been loose, noisy, and incapable of satisfactorily and safely supporting articles placed in the baskets.

U. S. Pat. No. RE 24,656 discloses a bicycle basket for velocipedes and the like, the rear and bottom walls of which are engaged by a center brace which includes a rearwardly projecting portion which extends beneath the central rigid portion of a handlebar for limiting the elevation of the basket relative to the handlebar. The basket is attached to the handlebar by means of a pair of laterally spaced metal clamps which embrace notched portions in the top wire of the basket and encircle the handlebars on opposite sides of the center brace for disposing the rearwardly projecting portion of the brace in elevated, abutting relationship with the underside of the central portion of handlebar.

SUMMARY OF THE INVENTION

The present invention is directed to simple yet highly effective means for securely suspending and fastening a basket from the handlebar of a tricycle, sidewalk bicycle, velocipede or the like by means of a single, rigid mounting member, one leg of which is permanently and rigidly affixed to portions of the rear wall of the basket, the other leg of which is adapted to overlie the central portion of the bicycle handlebar to which it is securely though releaseably anchored by means of a single metallic bracket-encircling strap or by means of the conventional mounting bolt which projects axially downwardly into the stem of the handlebar.

An object of the invention is to provide a conventional basket for use with a tricycle, sidewalk bicycle, velocipede, or the like wherein said basket is provided with single, efficient, simple yet highly effective means for positively anchoring the basket to the central handlebar portion of the vehicle.

DESCRIPTION OF THE INVENTION

These and other objects are attained by the means described herein and as disclosed in the accompanying drawings in which.

Figure 1:
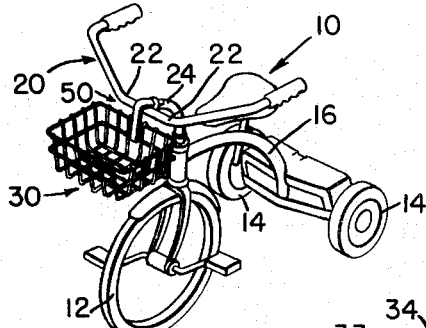
FIG. 1 is a perspective view of a tricycle, the handlebar of which has been provided with a basket embodying the teachings of the present invention.

With particular reference now to FIG. 1, the numeral 10 denotes generally a conventional tricycle which includes a forward wheel 12 and laterally spaced rear wheels 14 on which a frame 16 is suitably supported. The handlebar denoted generally by the numeral 20 comprises a pair of side members 22 which are formed integral with a central stem or support portion 24 which as best illustrated in FIG. 2 terminates in a downturned stem portion 26 which is receivable within the steering post housing 28 of the vehicle.

Figure 2:
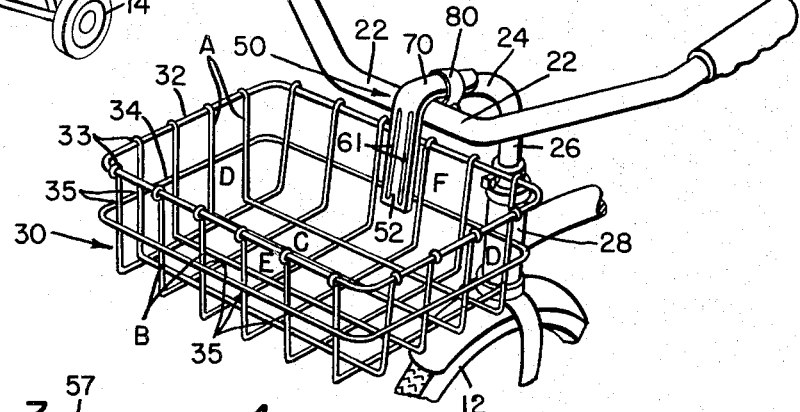
FIG. 2 is a perspective view, on an enlarged scale of the basket and handlebar portion of FIG. 1.
Figure 3:
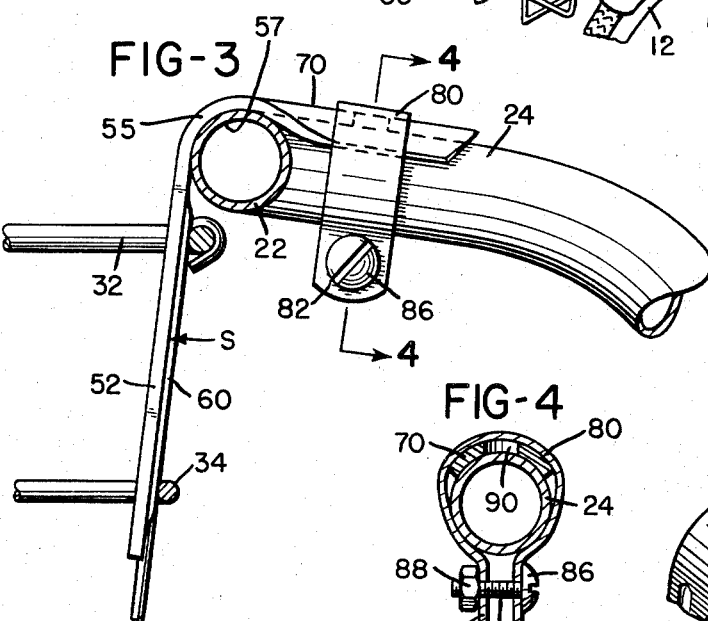
FIG. 3 is a sectional view taken just to the right edge of the mounting bracket 52 of FIG. 2.

A clearly illustrated in FIGS. 2 and 3 a wire basket denoted generally by the numeral 30 includes an upper, rigid, horizontal, peripheral wire 32 and a lower, rigid, intermediate horizontal peripheral wire 34. A series of basket-forming wires A and B are secured to and carried by peripheral wires 32 and 34, it being noted that the upper ends of wires A and B are bent over and around upper peripheral wire 32 as at 33, said wires being secured to the intermediate peripheral member 34 such as by welding at 35, whereby to provided what may be referred to as a conventional basket structure having a bottom C, and side, front and rear upstanding walls, D, E, and F, respectively.

The numeral 50 denotes a one-piece rigid bracket or mounting member having a first, forward depending leg 52 which projects downwardly into and is permanently secured relative to portions of the rear wall of the basket at the upper and intermediate peripheral members 32 and 34. Preferably leg 52 is provided with a pair of elongate laterally spaced, rearwardly extending ribs 60 which project from the rear surface S of leg 52, see FIG. 3 and 6, to provide and define the contact areas where said ribs are permanently secured, such as by projection welding, to the peripheral wires or member 32 and 34. Ribs 60 also enhance the rigidity of leg 52. The opposite surface of the leg 52 is provided with a pair of elongated grooves 61 which are made in the formation of the ribs 60.

Figure 4:
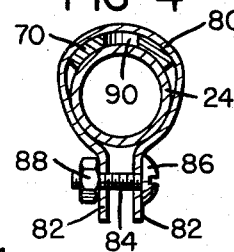
FIG. 4 is a sectional view taken on line 4—4 of FIG. 3.

The numeral 70 denotes a second, upper, rearwardly projecting mounting leg which is substantially concave in transverse cross-section as clearly evident from FIGS. 3 and 4 whereby to conform to the arcuate contour of steering post member 24 adjacent and centrally of side arms 22.

Leg 70 is firmly anchored to member 24 by means of a single metal clip 80 having an upper arcuate portion adapted to circumscribingly engage the upper, outer surface of leg 70 and the side and under portions of member 24, said clip terminating in a pair of laterally spaced, downwardly extending terminal ends 82 having an opening therethrough for the reception of a fastener such as, by way of example, shank 84 of a headed bolt 86, the free end of which is provided with a nut 88, as illustrated in FIG. 4 which, when tightened onto shank 84 will positively and rigidly secure leg 70, and basket 30 to the handlebar 20.

As clearly evident from FIG. 2, mounting member 50 comprises the sole means by which the basket is connected to the handlebar.

Figure 5:
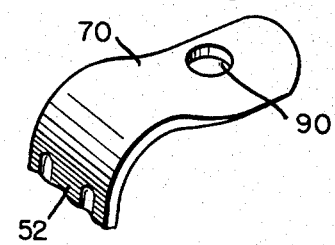
FIG. 5 is a perspective view of a modification of the mounting bracket.
Figure 6:
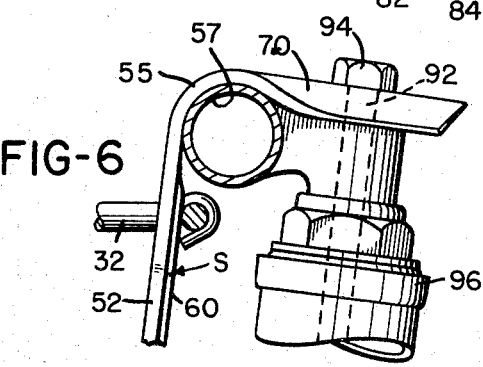
FIG. 6 is a view similar to FIG. 3 illustrating the use of the mounting bracket of FIG. 5.

In FIGS. 5 and 6 upper mounting leg 70 has been provided with an opening 90 for the reception of the shank 92 of an elongate bolt 94 which extends downwardly into steering post portion 96 of a bicycle.

With particular reference now to FIGS. 3 and 6 it will be noted that the intermediate portion 55 of the attachment member between legs 52 and 70 is contoured in a smooth, curved surface which is complementary to the outer curved surface of central portion 57 of the handlebar structure.

A basket when mounted as illustrated in FIGS. 2, 3 and 6 is positively and rigidly secured to member 24 of the handlebar whereby to eliminate any and all undesired relative movement and noise, and without the need for side straps whether of leather or metal, as in the prior art devices.

It will be noted that the entire weight of the basket is effectively and directly suspensably supported from the upper surface of the central portion of the handlebar. It will be further noted that all portions of the basket, and in particular the bottom and rear walls thereof, are rigidly mounted in spaced relationship with reference to the adjacent positions of the cycle.

The subject construction utilizes a rigid mounting bracket wherein the first, depending leg 52 is of a length sufficient to engage the upper end lower horizontal rigid peripheral frame wires 32 and 34, being entirely free of any further engagement with other portions of the basket. If desired, leg 52 could be secured to the outer sides of the rigid peripheral wires 32 and 34, in which event the reinforcing ribs 60 would project forwardly of the surface of said leg.

What is claimed is:

1. A bicycle basket and sole mounting means therefor, the basket comprising front rear, side, bottom walls and an open top, the front, rear and side walls having a first rigid peripheral wire circumscribing the top of the basket, a second peripheral wire surrounding the front, rear and side walls intermediate the first wire and the bottom wall, the mounting means comprising a one-piece bracket of right-angular configuration having a depending leg and a rearwardly extending leg, the depending leg being substantially flat on one surface and having tow spaced grooves therein, the grooves being spaced inwardly from side edges of the leg, the other surface having two spaced ribs thereon opposite to the grooves, the ribs being fixedly connected to the first and second wires of the basket by welding, the rearwardly extending leg being substantially concave in transverse cross section and overlying and substantially conforming to a central stem portion of a bicycle handlebar structure, mounting means engaging the rearwardly extending leg and the stem portion of the handlebar structure to securely but removably attach the basket to the bicycle and the angle portion of the one-piece bracket being curved and complementary to another curved surface of a portion of the handlebar structure, the curved angle portion overlying and in contact with the another curved surface of the portion of the handlebar structure.

2. A bicycle basket as called for in claim 1 wherein the means for securing the second leg of the mounting bracket to the central stem portion of the handlebar comprises a generally U-shaped sheet metal clip which encircles the second leg and central portion of the handlebar, and means for interconnecting and drawing the terminal ends of said clip together.

3. A bicycle basket as called for in claim 1 wherein the means for securing the second leg of the mounting bracket to the central stem portion of the handlebar comprises a bolt receptive opening in said leg disposed in registery with and having the stem of a steering post bolt extending therethrough to draw said leg against the top of the steering post.

* * * * *